(No Model.)
W. P. MILLER.
PROCESS OF RECOVERING PRECIOUS METALS.
No. 514,157. Patented Feb. 6, 1894.
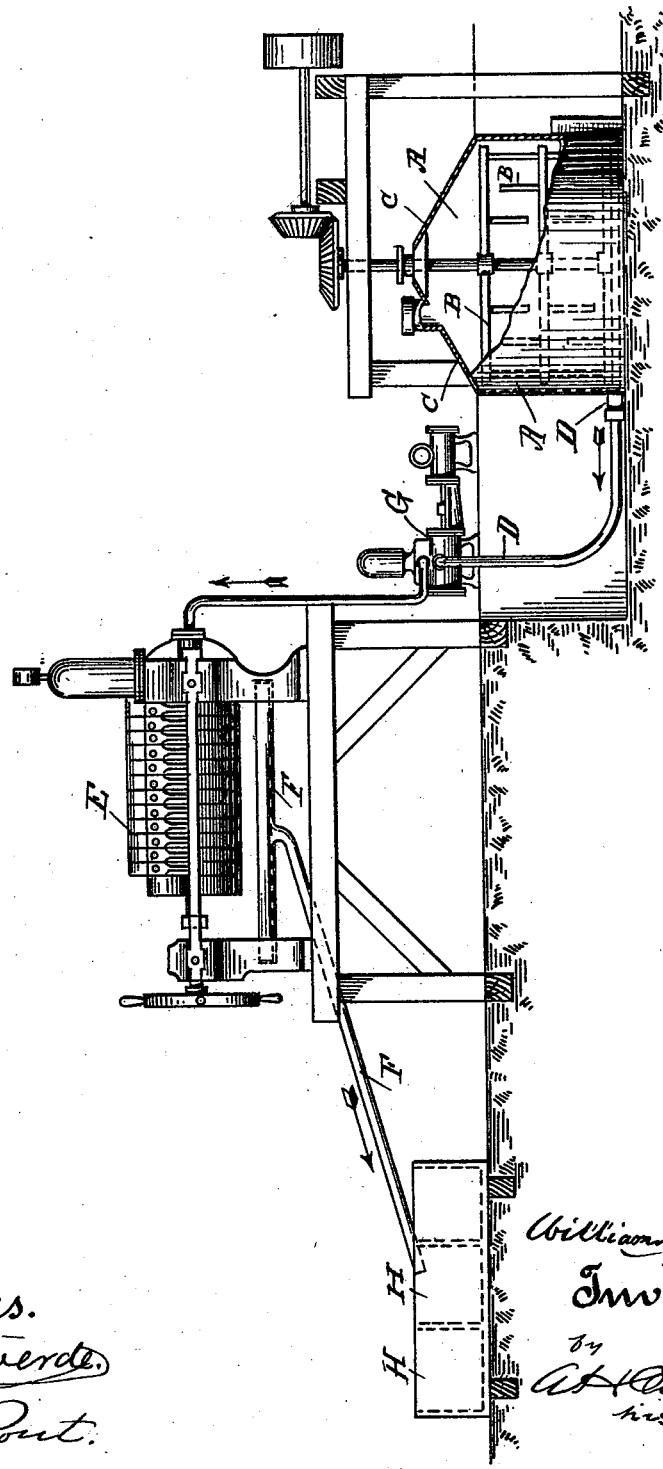
Witnesses.
H. Outwerde.
Thos. Rout.
William Penn Miller
Inventor.
by A. H. Evans & Co.
his Atty.

UNITED STATES PATENT OFFICE.

WILLIAM PENN MILLER, OF MELROSE, CALIFORNIA.

PROCESS OF RECOVERING PRECIOUS METALS.

SPECIFICATION forming part of Letters Patent No. 514,157, dated February 6, 1894.

Application filed May 29, 1893. Serial No. 475,930. (No model.)

*To all whom it may concern:*

Be it known that I, WILLIAM PENN MILLER, a citizen of the United States of America, residing at Melrose, Alameda county, State of California, have invented certain new and useful Improvements in Processes of Recovering Precious Metals; and I do hereby declare the following to be a full and clear description thereof, reference being had to the accompanying drawing, which forms part of this specification.

The object of my invention is to furnish an apparatus or plant for the treatment of slimes, sediments, earths, concentrated sulphides, sulphates, ores and all sedimentary matter and material containing gold and silver during treatment with a solution containing cyanogen or any substance or material yielding cyanogen; protecting and preserving the cyanide and cyanogen solution from decomposition from certain elements, that the extraction, separation and recovery of the gold and silver contained therein may be accomplished more economically and to a higher per cent. by preserving the strength of the cyanide and cyanogen solution as compared with the processes ordinarily known and employed in the treatment of ores, slimes and sediments containing gold and silver.

The invention will be hereinafter described and specifically pointed out in the claims.

The figure as displayed in the accompanying drawing represents one form of apparatus suitable for carrying out my process.

Generally stated the said apparatus consists of a vat, vessel or receptacle, fitted with revolving or movable arms or agitators and having an adjustable cap or cover so constructed as to be air tight, a pump connected by pipe with said vessel, a hydraulic filter press connected by pipe with said pump and a series of vessels or cells for receiving the gold-silver cyanide solution as expressed from the hydraulic filter press, that the gold and silver may be recovered from the solution by precipitation from the liquor by aid of any process now employed and known or by any other process, the whole plant being so constructed and arranged as to exclude atmospheric air and other decomposing agents during the operation and treatment, thereby protecting and preserving strength of the solvent cyanide and cyanogen.

In the processes heretofore known and ordinarily applied for the treatment of ores and compounds containing gold and silver in pans, vessels, tanks, mills and grinding as well as agitating plants there has been no attention given or claimed for the protection of the solvent agents from decomposition and resulting loss therefrom, necessarily resulting from exposing the cyanide and cyanogen solution to atmospheric influences during the operation, as during the process an excess of hydrocyanic acid gas is evolved from the cyanogen set free by decomposition, detracting from the solvent properties of the cyanide and cyanogen as a solvent, thereby retarding its action upon the metals and resulting in an increased quantity of cyanide required to obtain the desired results, adding greatly to the costs of the process and placing it beyond the value of gold and silver contents of the ore or compounds to be treated. The hydrocyanic acid gas escaping and intermixing with the atmosphere of the room or apartment in which the treatment and operation are conducted is a material objection, being a very poisonous gas detrimental to the health of the workmen, therefore exceedingly dangerous for them to remain any length of time in the vicinity.

My invention having for its object the preservation of the cyanide and cyanogen, the objections above indicated are obviated by my improved process of treatment in air tight vessels and connections, preserving the full strength of the cyanide and cyanogen solution from decomposition as indicated that the full strength can be retained, applied and utilized, thereby reducing expense of treatment also saving time and space required in dissolving the precious metals, finally expressing the gold and silver cyanide solution from the compound or residue by hydraulic filtration through a hydraulic filter press into receptacles prepared for precipitation of the precious metals. The whole process being a mechanical one, new and novel as applied to treatment of gold and silver compounds with cyanide and cyanogen or any material producing cyanogen.

In the treatment of slimes and fine sedimentary matter with cyanide or cyanogen in solution the difficulty met with in another process known as that of percolation results from the settling of the slimes and sedimentary material upon the filtering cloths placed upon the bottom or false bottoms of the vesvels, the slimes and sedimentary material becoming so compact as to retard the permeation and percolation of the cyanide solution and its action upon the gold and silver, as the principle of percolation and permeation as conducted depends upon the weight or pressure of the atmosphere upon the material and liquor treated the surface of the cyanide solution is constantly exposed to the surrounding atmosphere through influence of which the cyanide is gradually decomposed and its solvent agents escape, giving unsatisfactory results requiring many hours and several repetitions of the treatment and increased quantity of cyanide to dissolve the precious metals.

As will be observed my process permits of no settlement of the slimes and sedimentary materials, being one of constant agitation in presence of the solvent cyanide protected from decomposition in closed air tight vessels affording no opportunity for the introduction of atmospheric or other decomposing agencies after the filling of the vessel with the material under treatment, the vessels being so completely filled with the material and solvent and then closed from admission of all outer decomposing agencies, results in giving satisfactory and speedy action of the cyanide or cyanogen upon the gold and silver as well as preserving the strength of the cyanide for future use or treatment of another charge of ore or compound.

Having under my patent process of recovering precious metals No. 492,040 as applied for October 22, 1891, and granted February 21, 1893, perfected the process for recovering slimes and sedimentary values by agitation and hydraulic filtration: I now in the drawing attached to this application and forming part of the same, disclose my process for recovering the precious values from the slimes and sedimentary matter as collected by my former process or any other process.

In the drawing I disclose a complete plant under my process for the treatment of the slimes and sedimentary matter containing gold and silver when mixed with any of the cyanide solutions or cyanogen solvents, by agitation in a closed or air tight compartment, air tight connections and pumps and connections finally expressing the gold and silver cyanide solution from the sedimentary compound or residue by filtration through hydraulic filtering press. The process being a continuous mechanical operation or treatment of gold and silver ores and compounds in a solvent of cyanide or cyanogen by the application of machinery arranged and adapted for the purpose, having for its object the preservation of the solvent cyanide throughout the whole process.

In the drawing A is the air tight vat, vessel or receptacle for receiving the material to be treated under agitation, that is to say: the gold and silver ore, slime or compounds in a solution of cyanide, cyanogen or any material producing cyanogen, excluding the atmospheric air or any other decomposing agents or agency during the agitation or treatment.

"B" represents the arms or agitators connected with the shaft operated by other machinery.

"C" represents the air tight cap or cover.

"D" represents the air tight pipe discharge connected with the pump G.

"G" represents the air tight pump being connected with vat A by the pipe D as stated.

"E" represents the hydraulic filter press connected with the pump G by air tight pipe connections.

"F" represents the conduit or pipe connected with the chambers of the press E through which the gold and silver cyanide solution as expressed from the press is conveyed to the vessels H H for precipitation.

The process as operated is as follows, i. e.: The pulverized ore, compressed slimes, sediments, sedimentary matter or any material or compound containing gold and silver is introduced into the vessel A to which is added the solvent solution of cyanide in the desired quantity and requisite proportion forming a pulp sufficient in quantity to fill the vessel A to the level of the opening which is then closed by the air tight cap or cover C. Power motion is then given to the arms or agitators B B by which means the mass is continuously agitated and all the particles of matter or material containing gold and silver are brought in contact with the cyanide solvent. Upon testing the liquor and residue during the agitation it will be found that by the protection of the cyanide under this process the gold and silver become dissolved and passed into the solution forming a gold and silver cyanide solution, in a few hours generally from three to eight hours according to the compound treated. Having ascertained that the gold and silver have passed into solution, the pump as represented by G is put in operation and the contents of the vessel A are by suction drawn from the vessel A through the air tight pipe connections D and taken into the pump chamber G to be immediately forced through the air tight connection into a closed hydraulic filter press E in which the sedimentary matter is retained and compressed; the gold and silver cyanide solution being expressed as a clear liquor from the press and conveyed by the conduit or pipe F into the cells or vessels H in which the gold and silver are precipitated by any well known process of precipitation or any other process of recovery. The whole process it will be noted is a continuous economical mechanical one from first to last.

The residue in the press is then washed by forcing water through with the object of freeing it of any remaining cyanide gold and silver solution, to be reconveyed into a receptacle to be strengthened for further use.

I am aware that it is not new to employ closed or air tight vessels to confine chlorine and other gases generated during the treatment of ores and compounds by the process known as that of chlorination: and also that in using free cyanogen obtained as a gas, closed vessels have been recommended to confine the gas during a pressure treatment.

My process does not set up the employment of closed and air tight vessels for the purpose of saving and confining gas that has been purposely and designedly generated, my object being to introduce a process that will preserve and retain the full strength and solvent properties of the cyanide by excluding all unnecessary decomposing agents during the treatment of the compounds containing gold and silver in a solution of cyanide of potassium or sodium; and claim that from first to last I accomplish the object by my process, doing so economically and rapidly also mechanically by the application of machinery, thereby placing and making it possible to treat ores, slimes and compounds containing gold and silver in such small quantities that the precious metals can be recovered with a resulting profit. It can be applied to the low grade ores that comprise the larger portion of the gold bearing veins of the mineral zones, such ores are generally of the sulphureted character containing free gold and gold in combination with the sulphides. During the course of treatment a small percentage known as free gold is recovered by amalgamation, a few per cent. by concentration of the coarser sulphides, the larger per cent. of the gold and silver values during the process being reduced to an impalpable powder is held in suspension or in a state of flotation upon and mingled with the waters flowing to loss prior to the application of my process Patent No. 492,040, that the gold and silver contents can be recovered from the sands, iron, silica, lime, spar, magnesia, and other matter and earths with which the precious metals are combined. This to be accomplished either by the smelting the chlorine or the cyanide process. It is a matter of great importance from a financial standpoint that the amount of the reducing or solvent agents employed (that are in themselves expensive) should be reduced to as small proportions as possible, that the cost of treatment does not exceed the value of the gold and silver contained in the compounds. With this object in view I herewith introduce my process of preserving the cyanide that its solvent properties can be utilized with profit.

My process is of importance in the treatment and handling of material and compounds containing gold and silver in cyanide and cyanogen solutions, in that it preserves the cyanide from unnecessary wasteful decomposition thereby placing the extraction of the precious metals from ores, slimes and compounds upon an economic basis, that it can be applied more especially to the recovery of the values from the low grade ores that abound and constitute the larger portion of the gold bearing veins of the mineral zones and that are not being successfully treated with profit for the valued contents owing to the cost of the amount of cyanide and cyanogen required under the processes generally applied. I also regard as a step of great importance the hydraulic filtration of the cyanide solution and the expression thereby of the cyanide gold and silver solution from ores, compounds and residue.

Having thus described my invention, what I claim as new and original, and desire to secure by Letters Patent, is—

1. The herein described process of recovering precious metals which consists in introducing into an air tight vessel the gold or silver containing material, and the cyanogen or cyanide producing solution to protect said solution and prevent formation and escape of gases, then thoroughly agitating the mass in said air tight vessel, until a cyanide solution of the precious metal is formed, and withdrawing the whole mass from said vessel, and without contact with the air, and subjecting it to hydraulic filtration protected from atmospheric or other decomposing influences to produce a clear liquor from which the precious metal may be recovered in any suitable manner, substantially as herein described.

2. The herein described process of recovering precious metals which consists in thoroughly mixing the gold or silver bearing material, and a cyanide solution in an air tight vessel to protect said solution from atmospheric or other decomposing influences, and continuing said operation until the gold or silver is dissolved; then after the metal is dissolved while the mass is still being mixed or agitated forcing it from the said vessel through air tight connections, and subjecting it free from atmospheric influences to hydraulic filtration to produce a clear liquor from which the precious metal may be recovered in any suitable manner, substantially as herein described.

3. The herein described process of recovering precious metals which consists in thoroughly mixing the gold or silver bearing material, and a cyanide solution in an air tight vessel to protect the said solution from atmospheric and other decomposing influences, continuing said operation until the metal is dissolved; and while the gold or silver bearing material is still in suspension forcing the mass from said vessel through an air tight connection and subjecting it to hydraulic filtration without contact with the outer air to produce a clear liquor from subsequent treatment, and then washing the residuum resulting from the process of filtration to recover the remaining gold or silver cyanide solution, substantially as herein described.

4. The apparatus for use in the recovering of precious metals the same consisting in an air tight mixing vessel for the gold or silver bearing material and the solvent, an air tight hydraulic filter press, and an air tight pump having air tight connections with the said mixing vessel and filter press to force the solution from the vessel through the press free from all decomposing agencies, and a receptacle for receiving the flow from said press, substantially as herein described.

WILLIAM PENN MILLER.

Witnesses:
F. E. MONTEVERDE,
S. B. WOODWARD.